(12) United States Patent
Komatsu

(10) Patent No.: US 9,290,672 B2
(45) Date of Patent: Mar. 22, 2016

(54) INK COMPOSITION AND INK JET RECORDING METHOD

(75) Inventor: Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 476 days.

(21) Appl. No.: 13/480,923

(22) Filed: May 25, 2012

(65) Prior Publication Data

US 2012/0306977 A1 Dec. 6, 2012

(30) Foreign Application Priority Data

May 31, 2011 (JP) ................. 2011-121752

(51) Int. Cl.
*B41J 2/01* (2006.01)
*C09D 11/322* (2014.01)
*B41J 2/21* (2006.01)
*C09D 11/106* (2014.01)

(52) U.S. Cl.
CPC ............. *C09D 11/322* (2013.01); *B41J 2/01* (2013.01); *B41J 2/2107* (2013.01); *C09D 11/106* (2013.01)

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ............. 347/100, 96, 95, 101, 102, 103, 105, 347/88, 99, 21, 20, 9; 106/31.6, 31.13, 106/31.27; 523/160, 161
See application file for complete search history.

(56) References Cited

U.S. PATENT DOCUMENTS

| | | | |
|---|---|---|---|
| 5,546,108 A * | 8/1996 | Hotomi et al. ................. | 347/91 |
| 6,087,416 A | 7/2000 | Pearlstine et al. | |
| 6,271,285 B1 * | 8/2001 | Miyabayashi et al. ......... | 523/160 |
| 6,398,356 B1 * | 6/2002 | Fukuda et al. ................ | 347/100 |
| 6,590,012 B2 * | 7/2003 | Miyabayashi ................ | 523/160 |
| 6,723,784 B2 | 4/2004 | Ito et al. | |
| 7,338,988 B2 | 3/2008 | Hesler et al. | |
| 2005/0007432 A1 * | 1/2005 | Kanaya et al. ................ | 347/100 |
| 2005/0176847 A1 | 8/2005 | Cagle | |
| 2007/0142522 A1 | 6/2007 | Uerz et al. | |
| 2007/0197685 A1 | 8/2007 | Aruga et al. | |
| 2007/0263058 A1 * | 11/2007 | Sao et al. ..................... | 347/100 |
| 2008/0043080 A1 * | 2/2008 | Isobe .......................... | 347/101 |
| 2009/0162569 A1 | 6/2009 | Morohoshi et al. | |
| 2009/0295847 A1 * | 12/2009 | Mukai et al. .................. | 347/6 |
| 2010/0086692 A1 | 4/2010 | Ohta | |
| 2010/0196602 A1 | 8/2010 | Koyano et al. | |
| 2010/0302326 A1 | 12/2010 | Morohoshi et al. | |
| 2011/0234682 A1 * | 9/2011 | Ohta et al. .................... | 347/20 |

FOREIGN PATENT DOCUMENTS

| | | |
|---|---|---|
| EP | 1046687 A1 | 10/2000 |
| JP | 2000-044858 | 2/2000 |
| JP | 2000-303008 A | 10/2000 |
| JP | 2004-195451 | 7/2004 |
| JP | 3589408 | 8/2004 |
| JP | 2005-220352 | 8/2005 |
| JP | 3937170 | 4/2007 |
| JP | 2007-217671 | 8/2007 |
| JP | 2008-101192 | 5/2008 |
| JP | 2008-260926 A | 10/2008 |
| JP | 2009-067909 | 4/2009 |
| JP | 2009-235155 | 10/2009 |
| JP | 2010-042544 A | 2/2010 |
| JP | 2010-090266 A | 4/2010 |
| JP | 2010-111741 A | 5/2010 |

* cited by examiner

*Primary Examiner* — Manish S Shah
(74) *Attorney, Agent, or Firm* — Harness, Dickey & Pierce, P.L.C.

(57) ABSTRACT

An ink composition includes a coloring material; an alkyl polyol having a boiling point at one atmosphere in the range of 180 to 230° C.; first polymer particles having an average particle diameter of 200 nm or more and an MFT of less than 100° C.; and second polymer particles having an average particle diameter of less than 200 nm and an MFT of 100° C. or more. The ink composition does not substantially contain an alkyl polyol having a boiling point at one atmosphere of 280° C. or more.

15 Claims, No Drawings

INK COMPOSITION AND INK JET RECORDING METHOD

Priority is claimed under 35 U.S.C. §119 to Japanese Application No. 2011-121752 filed on May 31, 2011, and is hereby incorporated by reference in its entirety.

BACKGROUND

1. Technical Field

The present invention relates to an ink composition and an ink jet recording method using the ink.

2. Related Art

An ink jet recording method that records images and letters by discharging minute ink droplets from nozzles of an ink jet recording head has been mainly employed for recording on surfaces of ink-absorbing recording media such as paper. Ink compositions widely used in such an ink jet recording method contain various coloring materials such as dyes and/or pigments dissolved or dispersed in a mixture of an organic solvent having a high boiling point and water. The high boiling point organic solvent has low volatility and high water-holding capacity and thereby contributes to preventing nozzles of an ink jet recording head from drying.

There is a demand for an ink composition that is applicable to recording by the ink jet recording method on non-ink-absorbing or low-ink-absorbing recording media such as printing paper, synthetic paper, and films, as well as on water-absorbable recording media such as paper. Responding to such a demand, some ink compositions applicable to recording on non-ink-absorbing or low-ink-absorbing recording media have been proposed (for example, see JP-A-2007-217671, JP-A-2008-101192, and JP-A-2009-67909).

Unfortunately, these ink compositions contain high boiling point organic solvents, and thereby drying of inks tends to be slow when applied to recording on a non-ink-absorbing or low-ink-absorbing recording medium. As a result, the abrasion resistance of recorded images and letters decreases, and also uneven density defects tend to occur in areas to which large amounts of inks are applied, such as solid areas.

However, ink compositions not containing high boiling point organic solvents cannot prevent nozzles of an ink jet recording head from drying and tend to cause clogging of nozzles. In addition, the storage stability of inks tends to decrease.

SUMMARY

An advantage of some aspects of the invention is to provide an ink composition and an ink jet recording method that are applicable to printing on various recording media. That is, an advantage of some aspects of the invention is to provide an ink composition that exhibits high abrasion resistance in every recording on ink-absorbing, low-ink-absorbing, and non-ink-absorbing recording media, has excellent storage stability, and also can reduce clogging of nozzles. Another advantage of some aspects of the invention is to provide an ink jet recording method using the ink composition.

(1) An aspect of the invention is an ink composition including a coloring material; alkyl polyols having boiling points at one atmosphere in the range of 180 to 230° C.; first polymer particles having an average particle diameter of 200 nm or more and a minimum film-forming temperature (MFT) of less than 100° C.; and second polymer particles having an average particle diameter of less than 200 nm and an MFT of 100° C. or more, wherein the ink composition does not substantially contain alkyl polyols having boiling points at one atmosphere of 280° C. or more.

(2) Another aspect of the invention is the ink composition according to aspect (1), wherein the first polymer particles are selected from the group consisting of polyolefin resin particles, acrylic resin particles, and urethane resin particles.

(3) Another aspect of the invention is the ink composition according to aspect (1) or (2), wherein the second polymer particles are polyethylene wax particles.

(4) Another aspect of the invention is the ink composition according to any one of aspects (1) to (3), wherein the coloring material is a resin-dispersed pigment where a pigment is dispersed with a resin dispersant; and the resin-dispersed pigment has an average particle diameter of 50 nm or more and 180 nm or less.

(5) Another aspect of the invention is the ink composition according to any one of aspects (1) to (4), wherein the first polymer particles are ethylene-polar monomer copolymer resin particles.

(6) Another aspect of the invention is the ink composition according to any one of aspects (1) to (5), wherein the alkyl polyols are alkyl diols having 4 to 7 carbon atoms and not having side chain.

(7) Another aspect of the invention is the ink composition according to any one of aspects (1) to (6), further including a glycol ether having a hydrophile-lipophile balance (HLB) value calculated by a Davies' method of 4.2 to 8.0.

(8) Another aspect of the invention is the ink composition according to any one of aspects (1) to (7), further including an alkyl diol having 4 to 8 carbon atoms and having side chain.

(9) Another aspect of the invention is an ink jet recording method including: a first step of forming an image by discharging droplets of the ink composition according to any one of aspects (1) to (8) on a recording medium; and a second step of drying the ink composition on the recording medium by heating the recording medium during and/or after the first step.

(10) Another aspect of the invention is the ink jet recording method according to aspect (9), wherein the recording medium is an ink-absorbing, low-ink-absorbing, or non-ink-absorbing recording medium.

DESCRIPTION OF EXEMPLARY EMBODIMENT

A preferred embodiment of the invention will now be described in detail. The embodiment described below is merely an example of the invention. It is apparent that the invention is not limited to the following embodiment and includes various modifications made within the scope not changing the gist of the invention.

1. Ink Composition

An ink composition according to an aspect of the invention includes a coloring material, alkyl polyols having boiling points at one atmosphere in the range of 180 to 230° C., first polymer particles having an average particle diameter of 200 nm or more and an MFT of less than 100° C., and second polymer particles having an average particle diameter of less than 200 nm and an MFT of 100° C. or more, and the ink composition does not substantially contain alkyl polyols having boiling points at one atmosphere of 280° C. or more.

The alkyl polyols contained in the ink composition allow formation of images having excellent abrasion resistance on various recording media, in particular, on a non-ink-absorbing or low-ink-absorbing recording medium. The ink composition has high storage stability and also can prevent nozzle clogging. The ink composition containing the first polymer particles having an average particle diameter of 200 nm or more and an MFT of less than 100° C. and the second polymer particles having an average particle diameter of less than 200 nm and an MFT of 100° C. or more can provide recorded matter having high abrasion resistance not only on a water-absorbing recording medium such as paper but also on a non-ink-absorbing or low-ink-absorbing recording medium such as printing paper, synthetic paper, or a film.

The ink composition according to this embodiment does not substantially contain alkyl polyols having boiling points at one atmosphere of 280° C. or more. If an ink composition contains an alkyl polyol having a boiling point at one atmosphere of 280° C. or more, the drying property of the ink composition drastically decreases. As a result, uneven density defects become remarkable in images formed on various recording media, in particular, on non-ink-absorbing and low-ink-absorbing recording media, and the images cannot have sufficient fixability. Examples of the alkyl polyol having a boiling point at one atmosphere of 280° C. or more include glycerin having a boiling point at one atmosphere of 290° C.

In the invention, the term "not substantially containing A" refers to that A is not contained in an amount for sufficiently exhibiting a consequence of the addition. Specific examples of "not substantially containing" include containing A in an amount of less than 1.0 mass %, preferably containing A in an amount of less than 0.5 mass %, more preferably containing A in an amount of less than 0.1 mass %, further preferably containing A in an amount of less than 0.05 mass %, particularly preferably containing A in an amount of less than 0.01 mass %, and most preferably containing A in an amount of less than 0.001 mass %.

Each component used in this embodiment will now be described in detail.

1.1. Glycol Ether

The ink composition according to this embodiment preferably contains a glycol ether having an HLB value calculated by a Davies' method in the range of 4.2 to 8.0. In the ink composition according to the embodiment, the glycol ether having an HLB value in the above-mentioned range can control the wettability and the permeation rate of the ink composition with less influence by difference of recording media. Consequently, a clear image substantially not having uneven density defects can be recorded on various recording media, in particular, on a non-ink-absorbing or low-ink-absorbing recording medium.

The HLB value of glycol ether used in the embodiment is a value that was proposed by Davies, et al. for evaluating hydrophilicity of a compound and is determined by a Davies' method that is defined in, for example, "J. T. Davies and E. K. Rideal, Interface Phenomena, 2nd ed., Academic Press, New York, 1963". The HLB value can be calculated by the following Expression (1):

$$\text{HLB value} = 7 + \Sigma[1] + \Sigma[2] \quad (1)$$

(wherein [1] represents the number of hydrophilic groups, and [2] represents the number of hydrophobic groups).

Table 1 shows typical hydrophilic groups and hydrophobic groups and the numbers thereof.

TABLE 1

| Structure | Number of groups |
|---|---|
| —$CH_2$— | −0.475 |
| —$CH_3$ | −0.475 |
| —($CH_2CH_2O$)— | +0.330 |
| —(CHCH$_2$O)—<br>\|<br>$CH_3$ | −0.150 |
| —OH | +1.900 |

The glycol ether contained in the ink composition according to the embodiment has an HLB value calculated by the Davies' method in the range of 4.2 to 8.0, more preferably in the range of 5.8 to 8.0. A glycol ether having an HLB value of less than 4.2 has high hydrophobicity and low affinity to water serving as a main solvent. Such a glycol ether may decrease storage stability of the ink. A glycol ether having an HLB value of higher than 8.0 decreases wettability and permeability of an ink to a recording medium. Such a glycol ether may cause remarkable uneven density defects in an image. In particular, wettability to a hydrophobic surface, i.e., a non-ink-absorbing or low-ink-absorbing recording medium, tends to significantly decrease.

Specific examples of the glycol ether include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These glycol ethers can be used alone or as a mixture of two or more thereof.

Among these glycol ethers, glycol ethers of which alkyl groups have branched structures are more preferred. The ink composition containing a glycol ether of which alkyl group has a branched structure can record clear images having less uneven density defects, in particular, on non-ink-absorbing and low-ink-absorbing recording media. Specific examples of such a glycol ether include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether.

From the viewpoint of further increasing the color development, the branched structure of the alkyl group of the glycol ether is more preferably a 2-methylpentyl group, a 2-ethylpentyl group, or a 2-ethylhexyl group, and most preferably a 2-ethylhexyl group. Specific examples of such a glycol ether include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether. Particularly preferred are ethylene glycol mono-2-ethylhexyl ether, diethylene glycol mono-2-ethylhexyl ether, and triethylene glycol mono-2-ethylhexyl ether.

The content of the glycol ether is preferably in the range of 0.05 mass % or more and 6 mass % or less of the total amount of the ink composition, from the viewpoints of increasing wettability and permeability to a recording medium to reduce uneven density defects and ensuring high ink storage stability and discharging reliability. A content of less than 0.05 mass % decreases the wettability, permeability, and drying property of the ink composition, which may provide an unclear image or an insufficient printing density (color-developing property). On the contrary, a content of higher than 6 mass % increases the viscosity of the ink, which may cause head clogging, or leads to incomplete dissolution in the ink composition, which may deteriorate storage stability. The content of the glycol ether is more preferably in the range of 0.1 mass % or more and 2 mass % or less of the total amount of the ink composition.

1.2. Alkyl Polyols

The ink composition according to the embodiment contains alkyl polyols having boiling points at one atmosphere in the range of 180 to 230° C. In the ink composition according to the embodiment, the alkyl polyols having boiling points satisfying the above-mentioned range can control the wettability, permeability, and drying property of the ink composition regardless of the recording medium. Consequently, recorded images exhibit excellent fixability to various recording media, in particular, to non-ink-absorbing and low-ink-absorbing recording media, and also clogging of nozzles of an ink jet recording head decreases.

The alkyl polyols contained in the ink composition according to the embodiment also serve as a solubilizer of the glycol ether having an HLB value calculated by the Davies' method in the range of 4.2 to 8.0 into an ink vehicle.

The alkyl polyols contained in the ink composition according to the embodiment have boiling points at one atmosphere in the range of 180 to 230° C. and preferably include at least one polyol having a boiling point in the range of 190 to 220° C.

An alkyl polyol contained in the ink composition having a boiling point at one atmosphere of less than 180° C. increases the drying property of the ink composition, which may cause clogging of nozzles of an ink jet recording head. A boiling point at one atmosphere of higher than 230° C. decreases the drying property of the ink composition, which may cause remarkable uneven density defects in an image recorded on, in particular, a non-ink-absorbing recording medium and may decrease fixability of the image.

Specific examples of the alkyl polyols having boiling points at one atmosphere in the range of 180 to 230° C. include propylene glycol [188° C.], 1,3-propanediol [210° C.], 1,2-butanediol [194° C.], 1,3-butanediol [208° C.], 1,4-butanediol [230° C.], 1,2-pentanediol [210° C.], 3-methyl-1,3-butanediol [203° C.], 2-ethyl-2-methyl-1,3-propanediol [226° C.], 2-methyl-1,3-propanediol [214° C.], 2-methyl-2-propyl-1,3-propanediol [230° C.], 2,2-dimethyl-1,3-propanediol [210° C.], 2-methylpentane-2,4-diol [197° C.], dipropylene glycol [230° C.], and 1,2-heptanediol [227° C.]. The numerical values in parentheses show boiling points at one atmosphere.

The content of the alkyl polyols is preferably in the range of 5 mass % or more and 30 mass % or less of the total amount of the ink composition, from the viewpoints of effects of increasing wettability and permeability to a recording medium to reduce uneven density defects and ensuring high ink storage stability and discharging reliability. A content of less than 5 mass % decreases the storage stability of the ink composition and increases the drying property of the ink composition, which may cause clogging of nozzles of an ink jet recording head. On the contrary, a content of higher than 30 mass % decreases the drying property of the ink composition, which may cause remarkable uneven density defects in an image recorded on a non-ink-absorbing recording medium and may decrease fixability of the image. In addition, it is difficult to adjust the viscosity of the ink composition to a range suitable for an ink jet recording system.

Among the above-mentioned alkyl polyols, in particular, 1,2-straight chain alkyl diols having 4 to 7 carbon atoms (hereinafter also abbreviated to "C4-7") synergize with the glycol ether, which is an essential components of the invention, to show an effect of uniformly wetting a recording medium by further increased wettability of the ink composition and to show an effect of further increasing permeability, in addition to the above-mentioned effects. Accordingly, uneven ink density defects can be further decreased by adding C4-7 1,2-straight chain alkyl diols to the ink composition. In addition, the C4-7 1,2-straight chain alkyl diols exhibit high compatibility with the above-described glycol ether. Throughout the specification, the term "compatibility" refers to a combination of materials and a ratio of the materials among the components constituting an ink composition such that a mixture of the glycol ether and the C4-7 1,2-straight chain alkyl diols is completely dissolved in an ink composition of which main solvent is water. The solubility of a glycol ether in an ink composition can be increased by adding C4-7 1,2-straight chain alkyl diols having high compatibility with the glycol ether to the ink composition, and thereby the ink storage stability and discharge stability can increase. In addition, since the content of the glycol ether in the ink composition can be easily increased, the quality of a recorded image can be further improved.

Specific examples of the C4-7 1,2-straight chain alkyl diols having such characteristics include 1,2-butanediol [194° C.], 1,2-pentanediol [210° C.], 1,2-hexanediol [224° C.], and 1,2-heptanediol [227° C.]. Among them, in particular, C4-6 (4 to 6 carbon atoms) 1,2-straight chain alkyl diols, such as 1,2-butanediol, 1,2-pentanediol, and 1,2-hexanediol, are preferred from the viewpoints of solubility to water, compatibility with the glycol ether, moisture-retaining property against nozzle clogging, and also drying property of a printed image. For example, the amount of the C4-6 (4 to 6 carbon atoms) 1,2-straight chain alkyl diols is preferably 50 mass % or more of the alkyl polyols in an ink.

The content of the C4-7 1,2-straight chain alkyl diols is preferably in the range of 0.5 to 25 mass % of the total amount of the ink composition from the viewpoints of compatibility with the glycol ether, storage stability of the ink composition, and ensuring discharge stability, and, in particular, preventing clogging. The content is most preferably in the range of 1 to 20 mass %. In particular, in the second step (drying step) of the ink jet recording method using the ink composition, which is described below, since the evaporation and scattering rate of the C4-7 1,2-straight chain alkyl diols are sufficiently high, the drying rate of a recorded matter increases, resulting in a specific effect of accelerating the recording rate. In addition, no problem of odor in each step occurs. Clogging can also be reduced by further adding an alkyl diol having 4 to 8 carbon atoms and having a side chain to the ink composition.

1.3. Coloring Material

The ink composition according to the embodiment contains a coloring material. The coloring material is a dye or a pigment and is preferably a pigment from the viewpoint of having, for example, water resistance, gas resistance, and light resistance.

The pigment may be any of known inorganic pigments, organic pigments, and carbon blacks. The content of these pigments is preferably in the range of 0.5 mass % or more and 20 mass % or less, more preferably in the range of 1 mass % or more and 10 mass % or less, of the total amount of the ink composition.

In order to apply the pigment to the ink composition, it is necessary to stably disperse the pigment in water. Examples of the method therefore include a method of dispersing a pigment with a resin dispersant such as a water-soluble resin and/or a water-dispersible resin (hereinafter, the pigment treated with this method is referred to as "resin-dispersed pigment"), a method of dispersing a pigment with a water-soluble surfactant and/or a water-dispersible surfactant (hereinafter, the pigment treated with this method is referred to as "surfactant-dispersed pigment"), and a method of chemically and physically introducing a hydrophilic functional group to a pigment particle surface so that the pigment can be dispersed and/or dissolved in water without a dispersant such as the resin or the surfactant (hereinafter, the pigment treated with this method is referred to as "surface-treated pigment"). The ink composition according to the embodiment can utilize any of the resin-dispersed pigment, the surfactant-dispersed pigment, and the surface-treated pigment. These pigments may be also optionally used in combination, but the resin-dispersed pigment is preferred.

Examples of the resin dispersant used in the resin-dispersed pigment include polyvinyl alcohols, polyacrylic acids, acrylic acid-acrylnitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinylnaphthalene-acrylic acid copolymers, vinylnaphthalene-maleic acid copolymers, vinyl acetate-maleic acid ester copolymers, vinyl acetate-crotonic acid copolymers, and vinyl acetate-acrylic acid copolymers; and salts thereof. Among them, preferred are copolymers of monomers having hydrophobic functional groups and monomers having hydrophilic functional groups, and polymers of monomers having both hydrophobic functional groups and hydrophilic functional groups. The form of the copolymers may be any of random copolymers, block copolymers, alternating copolymers, and graft copolymers.

Examples of the salt include salts with basic compounds, such as ammonia, ethylamine, diethylamine, triethylamine, propylamine, isopropylamine, dipropylamine, butylamine, isobutylamine, diethanolamine, triethanolamine, triisopropanolamine, aminomethyl propanol, and morpholine. The basic compound may be added in any amount that is not lower than neutralization equivalent of the resin dispersant.

The molecular weight of the resin dispersant is preferably in the range of 1000 to 100000, more preferably in the range of 3000 to 10000, as a weight-average molecular weight. A molecular weight in this range can stably disperse the pigment in water and enables easy control of, for example, viscosity of the ink composition to which the resin dispersant applied.

The acid number is preferably in the range of 20 to 300 and more preferably in the range of 40 to 150. A resin dispersant having an acid number in this range stabilizes the dispersibility of pigment particles in water and enhances the water resistance and the color-developing property of recorded matter.

The resin dispersant mentioned above may be commercially available one, and specific examples thereof include Joncryl 67 (weight-average molecular weight: 12500, acid number: 213), Joncryl 678 (weight-average molecular weight: 8500, acid number: 215), Joncryl 586 (weight-average molecular weight: 4600, acid number: 108), Joncryl 611 (weight-average molecular weight: 8100, acid number: 53), Joncryl 680 (weight-average molecular weight: 4900, acid number: 215), Joncryl 682 (weight-average molecular weight: 1700, acid number: 238), Joncryl 683 (weight-average molecular weight: 8000, acid number: 160), and Joncryl 690 (weight-average molecular weight: 16500, acid number: 240) (the mentioned above are trade names of those manufactured by BASF Japan Corp.).

Examples of the surfactant used in the surfactant-dispersed pigment include anionic surfactants such as alkanesulfonates, α-olefin sulfonates, alkylbenzene sulfonates, alkylnaphthalene sulfonates, acylmethyl taurates, dialkyl sulfosuccinates, alkyl sulfates, sulfated olefins, polyoxyethylene alkyl ether sulfates, alkyl phosphates, polyoxyethylene alkyl ether phosphates, and monoglyceride phosphates; amphoteric surfactants such as alkylpyridium salts, alkyl amino acid salts, and alkyl dimethyl betaines; and nonionic surfactants such as polyoxyethylene alkyl ethers, polyoxyethylene alkyl phenyl ethers, polyoxyethylene alkyl esters, polyoxyethylene alkyl amides, glycerin alkyl esters, and sorbitane alkyl esters.

The addition amount of the resin dispersant or the surfactant is preferably 1 to 100 parts by mass, more preferably 5 to 50 parts by mass, based on 100 parts by mass of the pigment. In this range, dispersion stability of the pigment in water can be ensured.

Examples of the hydrophilic functional group of the surface-treated pigment include —OM, —COOM, —CO—, —SO$_3$M, —SO$_2$NH$_2$, —RSO$_2$M, —PO$_3$HM, —PO$_3$M$_2$, —SO$_2$NHCOR, —NH$_3$, and —NR$_3$ (in the formulae, M denotes a hydrogen atom, an alkali metal, ammonium, or organic ammonium; and R denotes an alkyl group having 1 to 12 carbon atoms, a phenyl group optionally having a substituent, or a naphthyl group optionally having a substituent). The functional group is physically and/or chemically introduced onto the surface of a pigment particle by direct grafting and/or via a multivalent group. Examples of the multivalent group include alkylene groups having 1 to 12 carbon atoms, phenylene groups optionally having substituents, and naphthylene groups optionally having substituents.

The above-mentioned surface-treated pigment is preferably pigment particles having surfaces treated with a sulfur-containing treatment agent so that —SO$_3$M and/or —RSO$_2$M (M represents a counter ion and denotes a hydrogen ion, an alkali metal ion, an ammonium ion, or an organic ammonium ion) chemically bonds to the pigment particle surfaces, i.e., pigment particles dispersed and/or dissolved in water by dispersing the pigment particles in a solvent that does not have an active proton, does not have reactivity with sulfonic acid, and does not dissolve or hardly dissolves the pigment and subsequently treating the surfaces of the resin particles with amidosulfuric acid or a complex of sulfur trioxide and tertiary amine so that —SO₃M and/or —RSO₂M chemically bonds to the particle surfaces.

One pigment particle may be grafted with one kind of functional group or a plurality of kinds of functional groups. The kind and the amount of the functional group to be grafted may be appropriately determined with consideration for, for example, dispersion stability in the ink, color density, and the drying property at the front face of an ink jet recording head.

The resin-dispersed pigment, the surfactant-dispersed pigment, and the surface-treated pigment described above can be each dispersed in water by mixing a pigment, water, and a resin dispersant or a surfactant, or a surface-treated pigment and water, with a water-soluble organic solvent, a neutralizer, and other components as necessary for each pigment, using a disperser that is commonly used, such as a ball mill, a sand mill, an attritor, a roll mill, an agitator mill, a Henschel mixer, a colloid mill, an ultrasonic homogenizer, a jet mill, or an angmill. In these cases, the dispersing is preferably performed until the average particle diameter of the pigment preferably becomes in the range of 20 to 500 nm, more preferably in the range of 20 to 200 nm, and most preferably in the range of 50 to 180 nm, for ensuring dispersion stability of the pigment in water.

Throughout the specification, the term "average particle diameter" refers to the average particle diameter on volume-basis unless specifically noted otherwise. The average particle diameter can be measured with a particle size distribution analyzer employing a laser diffraction/scattering method as the measurement principle. As the laser diffraction particle size distribution analyzer, for example, a particle size distribution analyzer employing a dynamic light scattering method as the measurement principle (e.g., "Microtrac UPA series", manufactured by Nikkiso Co., Ltd.) can be used.

1.4. Pyrrolidone Derivative

The ink composition according to the embodiment may further contain a pyrrolidone derivative. The ink composition containing the pyrrolidone derivative has characteristics that when droplets of the ink composition adhere to a recording medium, in particular, to a non-ink-absorbing film such as a polyvinyl chloride, polyethylene terephthalate, polyethylene, or polypropylene film, the ink composition wets and spreads uniformly thereon to give a sharp and clear image having less uneven density and bleeding defects even if the image is a solid one. The reason thereof is not obvious, but is assumed that since the pyrrolidone structure contained in the molecular skeletal structure of the pyrrolidone derivative has high affinity to a film-type recording medium, the wettability of the ink composition containing the pyrrolidone derivative to the film is also improved. In addition, since the pyrrolidone derivative has high compatibility with the above-mentioned glycol ether and alkyl polyols, the ink composition according to the embodiment can have both high storage stability and high discharge stability. Furthermore, the pyrrolidone derivative functions as a coating component after drying and therefore also contributes to an increase in abrasion resistance of the recorded image.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. In particular, 2-pyrrolidone is preferred from the viewpoints of ensuring storage stability of the ink composition, enhancing formation of a coating of a resin fixing agent, and relatively low odor.

The amount of the pyrrolidone derivative in the ink composition can be a level that is necessary for imparting desired characteristics to the ink composition of the embodiment. The preferred amount varies depending on the recording medium, but is preferably in the range of 0.1 to 10 mass %, more preferably in the range of 0.5 to 5 mass %, and most preferably in the range of 1 to 3 mass %, of the total amount of the ink composition. Within this range, the ink composition can have the above-described characteristics, and the viscosity of the ink composition can be easily controlled to an appropriate range for an ink jet recording system. For example, 2-pyrrolidone has a relatively high boiling point (245° C.), and an ink containing a large amount of 2-pyrrolidone therefore tends to hardly dry, which may decrease the abrasion resistance of an image printed on a non-ink-absorbing medium.

1.5. Surfactant

The ink composition according to the embodiment may further contain a surfactant. The ink composition containing the surfactant can wet and spread uniformly on a recording medium and can thereby record a clear image having less uneven density defects.

A surfactant having such an effect is preferably a nonionic surfactant. In particular, silicone-based and/or acetylene glycol-based nonionic surfactants show high compatibility and synergistic effects with the glycol ether and the alkyl polyols contained in the ink composition according to the embodiment and are therefore more preferred.

The silicone-based surfactants are preferably polysiloxane compounds such as polyether modified organosiloxane. More specifically, examples of the silicone-based surfactant include BYK-306, BYK-307, BYK-333, BYK-341, BYK-345, BYK-346, and BYK-348 (these are trade names of those manufactured by BYK-Chemie Japan, Inc.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (these are trade names of those manufactured by Shin-Etsu Chemicals Co., Ltd.). The content of the silicone-based surfactant is preferably 1.0 mass % or less of the total amount of the ink composition.

The acetylene glycol-based surfactant is excellent in ability of appropriately maintaining the surface tension and the interfacial tension, compared to other nonionic surfactants, and has a specific characteristic of hardly foaming. Consequently, the ink composition containing the acetylene glycol-based surfactant can appropriately maintain the surface tension and the interfacial tension between the ink and a printer member that is in contact with the ink, such as the surface of a head nozzle. This leads to enhancement of discharge stability in the case of applying the ink composition to an ink jet recording system. In addition, the acetylene glycol-based surfactant exhibits good wettability to a recording medium and functions as a penetrant, as in the glycol ether and the alkyl polyols. Consequently, the ink composition containing the acetylene glycol-based surfactant can record a highly fine image having less uneven density and bleeding defects. The content of the acetylene glycol-based surfactant is preferably 1.0 mass % or less of the total amount of the ink composition.

Examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, GA, and DF110D (these are trade names of those manufactured by Air Products and Chemicals, Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (these are trade names of those manufactured by Nissin Chemical Industry Co., Ltd.); and Acetyrenol E00, E00P, E40, and E100 (these are trade names of those manufactured by Kawaken Fine Chemicals Co., Ltd.).

1.6. Resin Particles

The ink composition according to the embodiment contains polymer particles as resin particles. The ink composition containing the resin particles can form an image having excellent abrasive resistance on a recording medium. In particular, in the case of recording an image on a non-ink-absorbing or low-ink-absorbing recording medium such as a vinyl chloride, polypropylene, or polyethylene film using the ink composition containing the resin particles, the image can have excellent abrasion resistance by performing the second step (drying step) in the ink jet recording method described below. This is because that the resin particles function so as to solidify the ink and to firmly fix the solidified ink on the recording medium and that heating in the second step (drying step) in the ink jet recording method described below can further accelerate this effect of the resin particles.

In the ink composition according to the embodiment, polymer particles (first polymer particles) having an average particle diameter of 200 nm or more and an MFT of less than 100° C. have effects of forming a resin coating and fixing the coating on a recording medium. Polymer particles (second polymer particles) having an average particle diameter of less than 200 nm and an MFT of 100° C. or more have effects of making the surface of recorded matter smooth and glossy and enhancing abrasion resistance. The ink composition containing both the polymer particles can form an image having high abrasion resistance on both a non-ink-absorbing recording medium and an ink-absorbing recording medium.

The reason why the abrasion resistance of recorded matter is increased by using two types of polymer particles described above as the resin particles has not been revealed yet, but it is assumed as follows.

Since the component constituting the polymer particles having an average particle diameter of 200 nm or more and an MFT of less than 100° C. has high affinity to both a non-ink-absorbing or low-ink-absorbing recording medium and a water-insoluble coloring agent, the polymer particles are firmly fixed on the recording medium while enwrapping the coloring agent during forming a resin coating. In addition, the component constituting the polymer particles having an average particle diameter of less than 200 nm and an MFT of 100° C. or more is also present on the surface of the resin coating and has characteristics of decreasing the frictional resistance of the resin coating surface. As a result, the formed resin coating is hardly abraded by friction from the outside and hardly detaches from the recording medium. Thus, the abrasion resistance of the recorded image increases.

That is, the ink composition according to the embodiment of the invention contains polymer particles having an average particle diameter of 200 nm or more and an MFT of less than 100° C. and also polymer particles having an average particle diameter of less than 200 nm and an MFT of 100° C. or more and thereby imparts excellent abrasion resistance to recorded matter formed on various recording media, in particular, on a non-ink-absorbing or low-ink-absorbing recording medium.

The first polymer particles having an average particle diameter of 200 nm or more and an MFT of less than 100° C. and the second polymer particles having an average particle diameter of less than 200 nm and an MFT of 100° C. or more will now be described in detail.

The resin constituting the first polymer particles having an average particle diameter of 200 nm or more and an MFT of less than 100° C. is preferably selected from the group consisting of polyolefin resins, acrylic resins, methacrylic resins, styrene resins, urethane resins, acrylamide resins, epoxy resins, and mixtures of these resins. In particular, the resin is preferably selected from the group consisting of polyolefin resins, acrylic resins, and urethane resins. The polyolefin resins are preferably selected from ethylene-polar monomer copolymers and olefin elastomers. These resins may be used as a homopolymer or a copolymer and may be used as a single-phase structure or a multi-phase structure (core-shell structure). More specific examples of the resin include ethylene-(meth)acrylic acid ester copolymers such as ethylene-(meth)acrylic acid ethyl ester copolymers, ethylene-(meth) acrylic acid methyl ester copolymers, ethylene-(meth)acrylic acid propyl ester copolymers, ethylene-(meth)acrylic acid butyl ester copolymers, ethylene-(meth)acrylic acid hexyl ester copolymers, ethylene-(meth)acrylic acid 2-hydroxyethyl ester copolymers, ethylene-(meth)acrylic acid 2-hydroxypropyl ester copolymers, and ethylene-(meth)acrylic acid glycidyl ester copolymers; ethylene-ethylene unsaturated acid copolymers such as ethylene-(meth)acrylic acid copolymers, ethylene-maleic acid copolymers, ethylene-fumaric acid copolymers, and ethylene-crotonic acid copolymers; ethylene-vinyl ester copolymers such as ethylene-vinyl acetate copolymers, ethylene-vinyl propionate copolymers, and ethylene-vinyl stearate copolymers; polyacrylic acid esters and copolymers thereof; polymethacrylic acid esters and copolymers thereof; polyacrylonitriles and copolymers thereof; polycyanoacrylates, polyacrylamides, polyacrylic acids, polymethacrylic acids, polyethylenes, polypropylenes, polybutenes, polyisobutylenes, polystyrenes, and copolymers thereof; petroleum resins; coumarone-endene resins; terpene resins; polyvinyl acetates and copolymers thereof; polyvinyl alcohols, polyvinyl acetals, polyvinyl ethers, polyvinyl chlorides, and copolymers thereof; polyvinylidene chlorides, fluororesins, fluororubbers, polyvinyl carbazoles, polyvinylpyridines, polyvinylimidazoles, polybutadienes, and copolymers thereof; polychloroprenes; polyisoprenes; and natural resins. In particular, preferred are resins having high compatibility with non-ink-absorbing films, such as vinyl chloride, polypropylene, and polyethylene films, (having hydrophobic moieties in molecular structures), and also having hydrophilic moieties showing high adhesiveness. For example, ethylene-vinyl ester copolymers and ethylene-(meth)acrylic acid ester copolymers are preferred, and ethylene-vinyl acetate copolymers are more preferred.

The first polymer particles described above may be commercially available one. Examples of such polymer particles include vinyl acetate polymer particles such as Polysol S-5, S-6, and S-5500 (these are trade names of those manufactured by Showa Kobunshi K.K.) and Bond CH2, CH3, CH5, CH7, and CH18 (these are trade names of those manufactured by Konishi Co., Ltd.); ethylene-vinyl acetate copolymer particles such as Panflex OM-4000 and OM-4200 (these are trade names of those manufactured by Kuraray Co., Ltd.), Sumikaflex 201HQ, 305HQ, 355HQ, 400HQ, 401HQ, 408HQ, 410HQ, 450HQ, 455HQ, 456HQ, 460HQ, 465HQ, 467HQ, 470HQ, 510HQ, 520HQ, 752, and 755 (these are trade names of those manufactured by Sumitomo Chemical Co., Ltd.), Denka EVA TEX 50, 55N, 59, 60, 65, 70, 75, 80, 81, 82, 88, 90, 100, and 170 (these are trade names of those manufactured by Denki Kagaku Kogyo K.K.), Chemipearl V100, V200, V300, and EV210H (these are trade names of those manufactured by Mitsui Chemicals, Inc.), and Vinyblan 3302, 1570, 1570J, 1570K, 1570L, 1540K, 1540L, A20J2, A23J1, A23J2, A34G2, A68J1, 4495LL, A23P2E, A68J1N, A70J9, B90J9, TLE-383, 4018, A22J7-F2, A22J8, 1157, 1502B Kai, 1588C, 1588CL, 1588C Kai, 1588FD, 1080, 1087, 1090B, 1571, A22J7-F2, 4470, 4485LL, 4495LL, 1042F, 1008, GV-6170, GV-6181, 1002, 1017-AD, KM-01, 1225, and 1245L (these are trade names of those manufactured by Nissin Chemical Industry Co., Ltd.); and ethylene/ vinyl acetate/(meth)acrylic acid copolymer particles such as Sumikaflex 900HL, 950HQ, and 951HQ (these are trade names of those manufactured by Sumitomo Chemical Co., Ltd.). Examples of commercially available ethylene-polar monomer copolymer particles include ethylene/vinyl acetate/ vinyl chloride copolymer particles such as Sumikaflex 850HQ (this is a trade name of that manufactured by Sumitomo Chemical Co., Ltd.). Other examples of commercially available polymer particles include Microgel E-1002 and Microgel E-5002 (these are trade names of those manufactured by Nippon Paint Co., Ltd.), Boncoat 4001 and Boncoat 5454 (these are trade names of those manufactured by Dainippon Ink & Chemicals, Inc.), SAE1014 (this is a trade name of that manufactured by Nippon Zeon Co., Ltd.), Saibinol SK-200 (this is a trade name of that manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (these are trade names of those manufactured by BASF Japan Corp.).

In particular, emulsified ethylene-vinyl acetate polymer particles, which are prepared by mixing about 8 to 35 wt % of a vinyl acetate monomer with an ethylene monomer and subjecting the mixture to emulsion polymerization under high pressure, have excellent water resistance, weather resistance, and alkali resistance and have enhanced adhesiveness to films of polyolefins such as polypropylene and polyethylene and high abrasion resistance. Such an ethylene-vinyl acetate copolymer preferably contains 8 to 35 wt %, in particular, 12 to 30 wt % of vinyl acetate from the viewpoints of, for example, adhesiveness to recording media, abrasion resistance, and water resistance.

The first polymer particles can be prepared by, for example, any of the methods shown below or by a combination thereof as necessary. For example, the first polymer particles can be prepared by a method of mixing a polymerization catalyst (polymerization initiator) and a dispersant with a monomer of the component constituting desired polymer particles and performing polymerization (that is, emulsion polymerization); a method of dissolving a polymer having a hydrophilic moiety in a water-soluble organic solvent, mixing the resulting solution with water, and then removing the water-soluble organic solvent by, for example, distillation; or a method of dissolving a polymer in a water-insoluble organic solvent and then mixing the resulting solution and a dispersant with an aqueous solution. These methods can be appropriately selected depending on the kind and the characteristics of the polymer to be used. Any dispersant can be used for dispersing a polymer into fine particles, and examples thereof include anionic surfactants (e.g., sodium dodecylbenzenesulfonate, sodium laurylphosphate, and polyoxyethylene alkyl ether sulfate ammonium) and nonionic surfactants (e.g., polyoxyethylene alkyl ether, polyoxyethylene alkyl ester, polyoxyethylene sorbitane fatty acid ester, and polyoxyethylene alkyl phenyl ether). These can be used alone or as a mixture of two or more thereof.

The first polymer particles have an average particle diameter of 200 nm or more, preferably in the range of 200 to 550 nm, and most preferably in the range of 200 to 350 nm. Polymer particles having an average particle diameter of less than 200 nm cannot impart sufficient abrasion resistance to recorded matter formed on an ink-absorbing recording medium such as high-quality paper.

The first polymer particles have an MFT less than 100° C., preferably in the range of 0 to 90° C., more preferably in the range of 0 to 50° C., and most preferably in the range of 20 to 40° C. The polymer particles preferably contain at least one type of such polymer particles. If the polymer particles have an MFT of 100° C. or more, a heating temperature of 100° C. or more may be necessary in the second step (drying step) described below. In such a case, the recording medium contracts or expands by the heat to cause wrinkles in a printed image, which may be disadvantageous. A component having an MFT of 0° C. or more exhibits an effect of forming a strong resin coating in the second step (drying step) described below. As a result, the recorded image can have further improved abrasion resistance. In addition, clogging of an ink at the nozzle end of an ink jet recording head can be prevented. On the contrary, in the case of using polymer particles composed of only components having an MFT of less than 0° C., a strong resin coating is hardly formed in the second step (drying step) described below, which may lead to insufficient abrasion resistance of a recorded image. Furthermore, the ink is solidified at the nozzle end to cause clogging.

Examples of the component constituting the second polymer particles having an average particle diameter of less than 200 nm and an MFT of 100° C. or more include plant/animal waxes such as carnauba waxes, candelilla waxes, beeswax, rice waxes, and lanolin; petroleum waxes such as paraffin waxes, microcrystalline waxes, polyethylene waxes, oxidized polyethylene waxes, and petrolatum; mineral waxes such as montan waxes and ozokerite; synthetic waxes such as carbon waxes, Hoechst waxes, polyolefin waxes, and stearic acid amide; natural and synthetic wax emulsions such as α-olefin-maleic anhydride copolymers; and wax mixtures. These can be used alone or as a mixture. Among these waxes, preferred are polyolefin waxes, in particular, polyethylene waxes and polypropylene waxes. Polyethylene waxes are most preferred. Commercially available wax particles may be directly used, and examples thereof include Nopcoat PEM17 (trade name, manufactured by SAN NOPCO Limited), Chemipearl W4005 (trade name, manufactured by Mitsui Chemicals, Inc.), and AQUACER 507, AQUACER 515, AQUACER 526, AQUACER 531, AQUACER 537, AQUACER 552, AQUACER 593, AQUACER 840, and AQUACER 1547 (trade names, manufactured by BYK-Chemie Japan, Inc.).

The average particle diameter of the polymer particles having an average particle diameter of less than 200 nm and an MFT of 100° C. or more is preferably in the range of 20 to 100 nm. An average particle diameter of 200 nm or more decreases abrasion resistance of recorded images formed on non-ink-absorbing recording media having smooth surfaces, such as films.

The MFT of the second polymer particles is 100° C. or more and is preferably in the range of 100 to 200° C. from the viewpoint of abrasion resistance. If the MFT is less than 100° C., the polymer particles soften due to frictional heat by rubbing, which leads to insufficient abrasion resistance.

In particular, when the ink composition according to the embodiment contains ethylene-vinyl acetate copolymer particles as the first polymer particles having an average particle diameter of 200 nm or more and an MFT of less than 100° C. and polyethylene wax particles as the second polymer particles having an average particle diameter of less than 200 nm and an MFT of 100° C. or more, printed images can have high abrasion resistance in every recording on ink-absorbing, low-ink-absorbing, and non-ink-absorbing recording media. The reason why the abrasion resistance of recorded images is increased by using these polymer particles described above has not been revealed yet, but it is assumed as follows.

Since the component constituting the ethylene-vinyl acetate copolymer particles has good affinity to both a non-ink-absorbing or low-ink-absorbing recording medium and a water-insoluble coloring agent, the copolymer particles are firmly fixed on the recording medium while enwrapping the coloring agent during forming a resin coating in the second step (drying step). In addition, the component constituting the polyethylene wax particles is also present on the surface of the resin coating and has characteristics of decreasing the frictional resistance of the resin coating surface. Consequently, due to the synergy effect of the ethylene skeletons of both resins, the formed resin coating is hardly abraded by friction from the outside and hardly detaches from the recording medium, and, therefore, the abrasion resistance of the recorded image increases.

The total content of the first polymer particles having an average particle diameter of 200 nm or more and an MFT of less than 100° C. and the second polymer particles having an average particle diameter of less than 200 nm and an MFT of 100° C. or more is preferably in the range of 0.5 to 10 mass % of the total amount of the ink composition, in terms of solid content. In this range, the ink composition according to the embodiment can be solidified and fixed on various recording media, in particular, even on non-ink-absorbing and low-ink-absorbing recording media, in combination with the second step (drying step) described below as a preferred ink jet recording method.

The content ratio of the first polymer particles to the second polymer particles (first polymer particles: second polymer particles) in the resin particles is preferably in the range of 1:5 to 10:1. Within this range, the above-described mechanism well works to increase the abrasion resistance of recorded images.

The first polymer particles and the second polymer particles contained in the ink composition according to the embodiment are preferably in fine particle forms (i.e., emulsion forms or suspension forms). The ink composition containing the resin particles in fine particle forms can easily control its viscosity to an appropriate range for an ink jet recording system and can easily ensure high storage stability and discharge stability.

1.7. Water

The ink composition according to the embodiment contains water. The water is the main solvent of the ink composition and is a component that evaporates and scatters in the second step (drying step) described below. The water is preferably water from which ionic impurities are removed as much as possible, such as pure water, e.g., deionized water, ultrafiltration water, reverse osmosis water, or distilled water, or ultrapure water. Use of water that has been sterilized by, for example, UV irradiation or addition of hydrogen peroxide can prevent occurrence of molds or bacteria and is therefore preferred when a pigment dispersion or an ink composition containing the same is stored for a long time.

1.8. Other Additives

The ink composition according to the embodiment can further optionally contain, for example, a permeation solvent, a humectant, an antiseptic/antifungal agent, a pH adjuster, and a chelating agent, in addition to the above-described structural components, from the viewpoint of improving the characteristics of the ink composition.

1.9. Physical Properties of Ink Composition

The pH of the ink composition is preferably neutral or alkaline and more preferably in the range of 7.0 to 10.0. If the pH is acidic, the storage stability and the dispersion stability of the ink composition may be deteriorated, and defects such as corrosion of metal parts used in the ink channel of an ink jet recording apparatus tend to occur. The pH can be adjusted to neutral or alkali with the above-mentioned pH adjuster.

The ink composition preferably has a viscosity at 20° C. in the range of 1.5 to 15 mPa·s. In this range, the ink can ensure high discharge stability in the first step described below.

The ink composition preferably has a surface tension at 25° C. of 15 to 40 mN/m, more preferably 20 to 30 mN/m. In this range, the ink can ensure high discharge stability in the first step described below and can also ensure appropriate wettability to non-ink-absorbing and low-ink-absorbing recording media.

1.10. Method of Producing Ink Composition

The ink composition according to the embodiment can be prepared by mixing the above-described materials in an appropriate order and removing impurities by, for example, filtration, as necessary. In the production of the ink composition, it is preferred to uniformly disperse a coloring agent in an aqueous solvent in advance and then mix the dispersion with other components, because of the easiness of handling.

The materials are preferably mixed by sequentially adding each of the materials to a container equipped with a stirring device such as a mechanical stirrer or a magnetic stirrer and stirring the mixture. The filtration can be optionally performed by, for example, centrifugal filtration or filter filtration.

2. Ink Jet Recording Method

The ink jet recording method according to the embodiment includes a first step of forming an image by discharging droplets of the ink composition described above onto a recording medium and a second step of drying the ink composition on the recording medium by heating the recording medium during and/or after the first step. Each step will now be described in detail.

2.1. First Step

The first step in the ink jet recording method according to the embodiment is a step of forming an image by discharging droplets of the ink composition onto a recording medium by an ink jet recording system.

The ink jet recording system can be any system that discharges the above-described ink composition as droplets from fine nozzles to allow the droplets to adhere to a recording medium. Examples of the ink jet recording system include the following four systems.

A first system is an electrostatic aspiration system. In this system, recording is performed by applying a strong electric field between a nozzle and an acceleration electrode placed in front of the nozzle, continuously ejecting ink droplets from the nozzle, and supplying a printing information signal to deflection electrodes while the ink droplets are traveling between the deflection electrodes; or by ejecting ink droplets corresponding to a printing information signal without deflecting the ink droplets.

A second system is a system of forcefully ejecting ink droplets by applying a pressure to an ink solution with a small-sized pump and mechanically vibrating a nozzle with, for example, a quartz oscillator. In this system, recording is performed by ejecting ink droplets and electrically charging the ejected ink droplets, simultaneously, and supplying a printing information signal to deflection electrodes while the ink droplets are traveling between the deflection electrodes.

A third system is a system using a piezoelectric element. In this system, recording is performed by simultaneously applying a pressure and a printing information signal to an ink solution with the piezoelectric element and ejecting ink droplets.

A fourth system is a system of sharply expanding the volume of an ink solution by an effect of thermal energy. In this system, recording is performed by heating the ink solution with a microelectrode according to a printing information signal to form foam and ejecting ink droplets thereby.

Any recording medium may be used according to requirement. In the ink jet recording method according to the embodiment, in particular, non-ink-absorbing or low-ink-absorbing recording media, in addition to plain paper, can be suitably used. Throughout the specification, the term "non-ink-absorbing or low-ink-absorbing recording medium" refers to a "recording medium that absorbs 10 mL/m$^2$ or less water from the initial contact with water until when 30 msec$^{1/2}$ has elapsed, when measured by a Bristow method". The Bristow method is most commonly used as a method for measuring the amount of liquid absorbed in a short period of time and is also employed by Japan Technical Association of the Pulp and Paper Industry (JAPAN TAPPI). The details of this test method are described in Standard No. 51 "Paper and Paperboard—Liquid Absorbency Test Method —Bristow Method" in JAPAN TAPPI Paper and Pulp Test Methods, 2000 Edition".

Examples of the non-ink-absorbing recording medium include plastic films not subjected to surface treatment for ink jet printing (i.e., not having an ink absorbing layer) and base materials, such as paper, provided with plastic coatings or plastic films thereon. Examples of the plastic used herein include polyvinyl chloride, polyethylene terephthalate, polycarbonate, polystyrene, polyurethane, polyethylene, and polypropylene. Examples of the low-ink-absorbing recording medium include printing paper such as art paper, coated paper, and mat paper. Examples of the ink-absorbing recording medium include high-quality paper, plain paper, and recycled paper.

2.2. Second Step

The second step in the ink jet recording method according to the embodiment is a step for drying the ink composition on the recording medium during and/or after the first step. By employing the second step, the liquid solvents contained in the ink composition adhering onto the recording medium partially or completely evaporate and scatter rapidly to form a coating of the first polymer particles having an average particle diameter of 200 nm or more and an MFT of less than 100° C. contained in the ink composition. Consequently, a high-quality image having less uneven density defects can be formed within a short period of time even on a non-ink-absorbing recording medium such as a plastic film not having an ink-absorbing layer. In addition, the formation of the resin coating allows the dried ink to adhere onto the recording medium and thereby the image to be fixed.

The second step may be any method that can accelerate evaporation and scattering of the liquid solvents contained in the ink composition. Examples of the method used as the second step include a method by applying a heat to the recording medium during and/or after the first step; a method by blowing air toward the ink composition on the recording medium after the first step; and a method of performing both the methods. Specifically, for example, forced-air heating, radiation heating, conduction heating, high-frequency drying, or microwave drying is preferably performed.

The heat temperature in the second step may be any range that accelerates evaporation and scattering of the liquid solvents contained in the ink composition. A temperature of 40° C. or more can achieve the effect, and the temperature range is preferably 40 to 90° C., more preferably 40 to 80° C. A temperature of higher than 100° C. may cause defects such as deformation in some types of recording media to cause difficulties in transporting of the recording media after the second step or may cause defects such as shrinkage when the recording media are cooled to room temperature.

The heating period in the second step may be any length of time that allows evaporation and scattering of the liquid solvents contained in the ink composition and formation of a coating of the polymer particles. The heating period can be appropriately set in consideration with the types of liquid solvents and the resin particles and the printing rate employed in the ink jet recording method.

EXAMPLES

3. Examples

The invention will be described in detail by examples below, but is not limited thereto.

3.1. Preparation of Ink Composition 3.1.1. Preparation of Pigment Dispersion

In the ink composition used in this example, a water-insoluble pigment (carbon black: C.I. Pigment Black 7) was used as the coloring agent. The pigment was dispersed with a resin dispersant in advance, and the resulting resin-dispersed pigment was added to the ink composition.

The pigment dispersion was prepared as follows: A mixture of 65 parts by mass of Color Black S170 (trade name of carbon black manufactured by Degussa-Huls AG), 35 parts by mass of Joncryl 611 (trade name of a styrene-acrylic acid dispersion resin manufactured by BASF Japan Corp.), 1.70 parts by mass of potassium hydroxide, and 250 parts by mass of ultrapure water purified by an ion-exchange method and a reverse osmotic method wad dispersed in a ball mill using zirconia beads for 10 hours. The resulting undiluted dispersion was filtered through a glass fiber filter GA-100 (trade name, manufactured by Advantec Toyo Kaisha Ltd.) to remove coarse particles, and the pigment concentration was adjusted to 15 mass %.

The particle size distribution of the resulting pigment dispersion was measured with a Microtruck UPA 150 (manufactured by Nikkiso Co., Ltd.) to confirm that the pigment had an average particle diameter of 117 nm.

3.1.2. Preparation of Ethylene-vinyl Acetate Polymer Particles A

A mixture of 100 parts by weight of an ethylene-vinyl acetate copolymer (Evaflex 220; manufactured Du Pont-Mitsui Polychemicals Co., Ltd., content of vinyl acetate: 28 wt %) and 10 parts by weight of potassium oleate was fed by a hopper of a twin-screw extruder (manufactured by Ikegai Iron Works, Ltd., model: PCM-30, L/D=40) at a rate of 3000 g/hr; a 1% aqueous solution of potassium hydroxide was continuously supplied at a rate of 150 g/hr from a supply port provided on a vent area of the same extruder; and then continuous extrusion was performed at a heating temperature of 160° C. The extruded resin mixture was cooled to 90° C. with a static mixer equipped with a jacket disposed at a port of the same extruder and was then charged into a hot water of 80° C. to obtain ethylene-vinyl acetate polymer particles A having a solid concentration of 40% and a pH of 9. The particle size distribution of the resulting aqueous dispersion of ethylene-vinyl acetate polymer particles A was measured with a Microtruck UPA 150 (manufactured by Nikkiso Co., Ltd.) to confirm that the polymer particles had an average particle diameter of 250 nm and an MFT of 20° C.

The "MFT" described in examples was measured as follows.

Polymer particles (emulsion) are thinly applied on an aluminum plate equipped with a heater and a thermometer in a chamber controlled to an appropriate temperature. Immediately after the application, the aluminum plate is covered with a basket (having a transparent window) containing a silica gel to dry the coated film. After drying of the coated film, the aluminum plate is heated, and the temperature at which cloudy portions of the coated film change into a uniform continuous coating is visually confirmed as the MFT.

3.1.2. Preparation of Ink Composition

Black ink compositions having different material compositions shown in Tables 2 and 3 were prepared using the pigment dispersions prepared in "3.1.1. Preparation of pigment dispersion". Each ink composition was prepared by placing the materials shown in Table 2 or 3 in a container, stirring the materials with a magnetic stirrer for 2 hr for mixing, and then removing coarse particles and impurities such as foreign matter by filtration through a membrane filter with a pore diameter of 10 μm. Note that the numerical values shown in Tables 2 and 3 all represent mass % and that deionized water was added to adjust the total amount of the ink to 100 mass %. The ink composition of Comparative Example 4 was produced in accordance with the ink composition example described in JP-A-2008-101192. The numerical values shown in Tables 2 and 3 are addition amounts (the numerical values in parentheses are concentrations in the respective inks).

TABLE 2

| Component | Material | Example 1 | 2 | 3 | 4 | 5 | 6 | 7 | 8 | 9 | 10 | 11 | 12 |
|---|---|---|---|---|---|---|---|---|---|---|---|---|---|
| Coloring material | Carbon black pigment dispersion (pigment content: 15%) | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) |
| Glycol ether | Tripropylene glycol monomethyl ether (HLB value: 8.0) | — | | | | | | 2 | | | | | |
| | Triethylene glycol monohexyl ether (HLB value: 7.0) | | | | | | | | | | | 1 | |
| | Ethylene glycol mono-2-ethylhexyl ether (HLB value: 5.4) | 0.5 | | 0.5 | 0.5 | 0.5 | 0.5 | | | | | | 0.5 |
| | Diethylene glycol mono-2-ethylhexyl ether (HLB value: 5.8) | | 0.5 | | | | | | 1 | 0.5 | 0.5 | | |
| Alkyl polyol | Propylene glycol (boiling point: 188° C.) | 15 | | 15 | 15 | 15 | 15 | 10 | 5 | 15 | 5 | 15 | 15 |
| | 1,2-Butanediol (boiling point: 194° C.) | | 15 | | | | | | 5 | | 5 | | |
| | 1,2-Pentanediol (boiling point: 210° C.) | | | | | | | 5 | | | 5 | | |
| | 1,2-Hexanediol (boiling point: 224° C.) | 4 | 3 | 4 | 4 | 4 | 4 | 3 | 3.5 | 1 | 3 | 4 | 4 |
| | 3-Methyl-1,3-butanediol (boiling point: 203° C.) | | | | | | | | 5 | | | | |
| | Glycerin (boiling point: 290° C.) | | | | | | | | | | | | |
| Pyrrolidone derivative | 2-Pyrrolidone | | | | | | | 3 | | | 1 | | |
| Surfactant | BYK-348 (silicone-based surfactant) | 0.5 | 0.4 | 0.5 | 0.5 | 0.5 | 0.5 | 0.5 | 0.4 | 0.5 | 0.4 | 0.5 | 0.6 |
| | Surfynol DF110D (acetylene glycol-based surfactant) | 0.2 | 0.3 | 0.2 | 0.2 | 0.2 | 0.2 | 0.2 | 0.2 | 0.2 | 0.3 | 0.2 | 0.2 |
| Resin particles | Ethylene-vinyl acetate emulsion A (concentration: 40%, φ = 230 nm, MFT = 20° C.) | | | | 2.5 (1%) | | | | | | 1.25 (0.5%) | | |
| | Sumikaflex 752 (ethylene-vinyl acetate emulsion, | 2 | 2 | | | | | | | | | | |

TABLE 2-continued

| Component | Material | Example 1 | 2 | 3 | 4 | 5 | 6 | 7 | 8 | 9 | 10 | 11 | 12 |
|---|---|---|---|---|---|---|---|---|---|---|---|---|---|
| | concentration: 50%, φ = 500 nm, MFT = 15° C.) | (1%) | (1%) | | | | | | | | | | |
| | Sumikaflex 465HQ (ethylene-vinyl acetate emulsion, concentration: 65%, φ = 1μm, MFT = 0° C.) | | (1%) | 2 | | | | | | | | | |
| | SF860 (urethane emulsion, concentration: 40%, φ = 200 nm, MFT = 28° C.) | | | | (1%) | 2.5 | | | | | | | |
| | Joncryl 790 (styrene-acrylic emulsion, concentration: 47%, φ = 200 nm, MFT = 70° C.) | | | | | | 2.2 (1%) | 1 (0.5%) | 10 (5%) | 10 (5%) | | 0.22 (0.1%) | 18 (8.5%) |
| | Joncryl 1535 (styrene-acrylic emulsion, concentration: 41%, φ = 160 nm, MFT = 15° C.) | | | | | | | | | | | | |
| | AQUACER 515 (polyethylene wax emulsion, concentration: 35%, φ = 60 nm, MFT = 130° C.) | 1.43 (0.5%) | 2.86 (1%) | 1.43 (0.5%) | 1.43 (0.5%) | 1.43 (0.5%) | 1.43 (0.5%) | 1.43 (0.5%) | 2.86 (1%) | 14 (4.9%) | 2.86 (1%) | 1.43 (0.5%) | 2.86 (1%) |
| | AQUACER 539 (mixed wax emulsion, concentration: 35%, φ = 54 nm, MFT = 90° C.) | | | | | | | | | | | | |
| | Chemipearl W4005 (polyethylene wax emulsion, concentration: 40%, φ = 600 nm, MFT = 110° C.) | | | | | | | | | | | | |
| pH adjuster | Tripropanolamine | 0.1 | 0.1 | 0.1 | 0.1 | 0.1 | 0.1 | 0.1 | 0.1 | 0.1 | 0.1 | 0.1 | 0.1 |
| Chelating agent | Ethylenediaminete traacetic acid | 0.05 | 0.05 | 0.05 | 0.05 | 0.05 | 0.05 | 0.05 | 0.05 | 0.05 | 0.05 | 0.05 | 0.05 |
| Solvent | Deionized water | Balance | Balance | Balance | Balance | Balance | Balance | Balance | Balance | Balance | Balance | Balance | Balance |

TABLE 3

| Component | Material | Comparative Example 1 | 2 | 3 | 4 |
|---|---|---|---|---|---|
| Coloring material | Carbon black pigment dispersion (pigment content: 15%) | 50 (7.5%) | 50 (7.5%) | 50 (7.5%) | 50 (7.5%) |
| Glycol ether | Tripropylene glycol monomethyl ether (HLB value: 8.0) | — | — | — | — |
| | Triethylene glycol monohexyl ether (HLB value: 7.0) | — | — | — | — |
| | Ethylene glycol mono-2-ethylhexyl ether (HLB value: 5.4) | 0.5 | 0.5 | 0.5 | 0.5 |
| | Diethylene glycol mono-2-ethylhexyl ether (HLB value: 5.8) | — | — | — | — |
| Alkyl polyol | Propylene glycol (boiling point: 188° C.) | 15 | 15 | 15 | — |
| | 1,2-Butanediol (boiling point: 194° C.) | — | — | — | — |
| | 1,2-Pentanediol (boiling point: 210° C.) | — | — | — | — |
| | 1,2-Hexanediol (boiling point: 224° C.) | 4 | 4 | 4 | 4 |
| | 3-Methyl-1,3-butanediol (boiling point: 203° C.) | — | — | — | — |
| | Glycerin (boiling point: 290° C.) | — | — | — | 10 |
| Pyrrolidone derivative | 2-Pyrrolidone | — | — | — | — |

TABLE 3-continued

| Component | Material | Comparative Example | | | |
|---|---|---|---|---|---|
| | | 1 | 2 | 3 | 4 |
| Surfactant | BYK-348 (silicone-based surfactant) | 0.5 | 0.5 | 0.5 | 0.5 |
| | Surfynol DF110D (acetylene glycol-based surfactant) | 0.2 | 0.2 | 0.2 | 0.2 |
| Resin particles | Ethylene-vinyl acetate emulsion A (concentration: 40%, $\phi$ = 230 nm, MFT = 20° C.) | — | — | — | — |
| | Sumikaflex 752 (ethylene-vinyl acetate emulsion, concentration: 50%, $\phi$ = 500 nm, MFT = 15° C.) | — | 2 (1%) | 2 (1%) | 2 (1%) |
| | Sumikaflex 465HQ (ethylene-vinyl acetate emulsion, concentration: 65%, $\phi$ = 1 μm, MFT = 0° C.) | — | — | — | — |
| | SF860 (urethane emulsion, concentration: 40%, $\phi$ = 200 nm, MFT = 28° C.) | — | — | — | — |
| | Joncryl 790 (styrene-acrylic emulsion, concentration: 47%, $\phi$ = 200 nm, MFT = 70° C.) | — | — | — | — |
| | Joncryl 1535 (styrene-acrylic emulsion, concentration: 41%, $\phi$ = 160 nm, MFT = 15° C.) | 2.44 (1%) | — | — | — |
| | AQUACER 515 (polyethylene wax emulsion, concentration: 35%, $\phi$ = 60 nm, MFT = 130° C.) | 1.43 (0.5%) | — | — | 1.43 (0.5%) |
| | AQUACER 539 (mixed wax emulsion, concentration: 35%, $\phi$ = 54 nm, MFT = 90° C.) | — | — | 1.43 (0.5%) | — |
| | Chemipearl W4005 (polyethylene wax emulsion, concentration: 40%, $\phi$ = 600 nm, MFT = 110° C.) | — | 1.25 (0.5%) | — | — |
| pH adjuster | Tripropanolamine | 0.1 | 0.1 | 0.1 | 0.1 |
| Chelating agent | Ethylenediaminetetraacetic acid | 0.05 | 0.05 | 0.05 | 0.05 |
| Solvent | Deionized water | Balance | Balance | Balance | Balance |

In Tables 2 and 3, the materials identified by trade names are as follows:

BYK-348 (manufactured by BYK-Chemie Japan, Inc., silicone-based surfactant),

Surfynol DF110D (manufactured by Nissin Chemical Industry Co., Ltd., acetylene glycol-based surfactant), Sumikaflex 752 (manufactured by Sumitomo Chemical Co., Ltd., ethylene-vinyl acetate emulsion (50% dispersion)), Sumikaflex 465HQ (manufactured by Sumitomo Chemical Co., Ltd., ethylene-vinyl acetate emulsion (65% dispersion)), SF860 (manufactured by Daiichi Kogyo Co., Ltd., urethane emulsion (40% dispersion)), Joncryl 790 (manufactured by BASF Japan Corp., styrene-acrylic particles emulsion (47% dispersion)), Joncryl 1535 (manufactured by BASF Japan Corp., styrene-acrylic particles emulsion (41% dispersion)), AQUACER 515 (manufactured by BYK-Chemie Japan, Inc., polyethylene wax emulsion (35% dispersion)), AQUACER 539 (manufactured by BYK-Chemie Japan, Inc., mixed wax emulsion (35% dispersion)), and Chemipearl W4005 (manufactured by Mitsui Chemicals, Inc., polyethylene wax emulsion (40% dispersion)).

3.2. Evaluation of Ink Composition 3.2.1. Storage Stability of Ink Composition

Each ink composition shown in Table 2 or 3 was sealed in a sample bottle and was left to stand under the environment of a temperature of 60° C. for 2 weeks. After the leaving, each ink composition was evaluated for storage stability by observing change in viscosity of the ink and separation/sedimentation/aggregation states of the ink components. The evaluation results are shown in Table 4. The evaluation criteria are as follows:

Change in Viscosity
  A: change ratio of the viscosity compared to that immediately after the preparation is less than ±5%,
  B: change ratio of the viscosity compared to that immediately after the preparation is ±5% or more but less than ±10%,
  C: change ratio of the viscosity compared to that immediately after the preparation is ±10% or more but less than ±20%, and
  D: change ratio of the viscosity compared to that immediately after the preparation is ±20% or more.

Separation/Segmentation/Aggregation of Ink Components
  A: no separation/segmentation/aggregation of ink components is observed,
  B: any of separation/segmentation/aggregation of ink components is slightly observed,
  C: any of separation/segmentation/aggregation of ink components is obviously observed, and
  D: any of separation/segmentation/aggregation of ink components is significant.

TABLE 4

| | Example | | | | | | | | | | | | Comparative Example | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 |
| (1) Change in viscosity | B | A | C | B | B | B | C | C | C | A | A | C | B | B | B | B |
| (2) Separation/sedimentation/aggregation of ink components | B | A | C | A | A | B | B | C | C | A | A | C | A | D | B | B |

As shown in Table 4, the ink compositions of Examples have no problems in viscosity change and in separation/segmentation/aggregation of ink components and are thus excellent in storage stability.

3.2.2. Clogging of Head

The head of an ink jet recording system, an ink jet printer (trade name: PX-G930, manufactured by Seiko Epson Corp., nozzle resolution: 180 dpi), was filled with any of the ink compositions shown in Tables 2 and 3. After confirmation of no filling defect and nozzle clogging by printing a nozzle check pattern, the printer head was left to stand in an uncapped state (i.e., a state for accelerating drying of head nozzle face) under the environment of 25° C./40 to 60% RH for one week. Subsequently, cleaning operation was optionally performed, and then a nozzle check pattern was printed. Clogging of the ink jet head with the ink composition was evaluated by observing discharging conditions of the nozzles. The evaluation results are shown in Table 5. The evaluation criteria are as follows:

A: all nozzles normally discharge an ink composition after three or less times of cleaning operations,
B: all nozzles normally discharge an ink composition after four to six times of cleaning operations,
C: all nozzles normally discharge an ink composition after seven to ten times of cleaning operations, and
D: all nozzles normally discharge an ink composition after eleven or more times of cleaning operations, or any of nozzles does not normally discharge an ink composition even after eleven or more times of cleaning operations.

TABLE 5

|  | Example | | | | | | | | | | | | Comparative Example | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 |
| Head clogging | B | A | C | A | A | B | B | C | C | A | A | C | A | D | B | A |

As shown in Table 5, the sizes of the polymer particles of Comparative Example 2 were too large, and clogging probably thereby occurred.

3.2.3. Evaluation of Uneven Density Defects of Recorded Matter

As recording media, ink-absorbing high-quality paper (trade name: "55PW8R", manufactured by Lintec Corp.), low-ink-absorbing printing paper (trade name: "POD Gloss Coat", manufactured by Oji Paper Co., Ltd.), and a non-ink-absorbing polypropylene film (trade name: SY51M 2.6 mil. PP White TC RP37 2.2 mil. HIGH DENSITY WHITE, manufactured by UPM Raflata OY, hereinafter referred to as "SY51M") were used. As the printer of an ink jet recording system, an ink jet printer (trade name: PX-G930, manufactured by Seiko Epson Corp., nozzle resolution: 180 dpi) equipped with a temperature variable heater at the paper guiding portion was used.

The ink jet printer was filled with any of the ink compositions, and an image was recorded on any of the recording media. A solid image pattern was recorded at a resolution of 720 dpi in the lateral direction and 720 dpi in the vertical direction with a duty in the range of 50 to 100% at 10% intervals. The recording conditions of the heater of the printer were set to "40° C. at the recording surface". Drying treatment was performed by blowing air with a temperature of 80° C. to each recorded matter during and immediately after the recording. The blowing strength was set to a wind velocity of about 2 to 5 m/sec at the recording medium surface. The blowing time immediately after printing was one minute. The recorded matter formed under these conditions was visually inspected for uneven density defects. The evaluation results are shown in Tables 6 to 8. Table 6 shows the evaluation results in the case of using high-quality paper (5PW8R) as the recorded medium, Table 7 shows the evaluation results in the case of using printing paper (POD Gloss Coat) as the recorded medium, and Table 8 shows the evaluation results in the case of using a polypropylene film (SY51M) as the recording medium. The evaluation criteria of uneven density defects are as follows:

A: no uneven density defects are observed even at a duty of 80% or more,
B: no uneven density defects are observed until a duty of 70%,
C: no uneven density defects are observed until a duty of 60%, and
D: uneven density defects are observed even at a duty of 60% or less.

TABLE 6

|  | Example | | | | | | | | | | | | Comparative Example | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 |
| Uneven density defects of recorded matter (55PW8R) | A | A | A | A | A | A | A | A | A | A | B | A | A | A | B | C |
| Abrasion resistance of recorded matter (55PW8R) | B | A | B | A | A | B | B | A | A | A | C | A | D | A | C | D |

TABLE 7

|  | Example | | | | | | | | | | | | Comparative Example | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 |
| Uneven density defects of recorded matter (POD Gloss Coat) | A | A | A | A | B | A | A | B | A | B | A | A | C | B | C |

TABLE 7-continued

|  | Example | | | | | | | | | | | | Comparative Example | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 |
| Abrasion resistance of recorded matter (POD Gloss Coat) | A | A | A | A | A | A | A | A | A | C | A | B | C | C | D |

TABLE 8

|  | Example | | | | | | | | | | | | Comparative Example | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 |
| Uneven density defects of recorded matter (SY51M) | A | A | B | A | A | B | B | A | B | A | B | B | A | B | B | D |
| Abrasion resistance of recorded matter (SY51M) | B | A | B | A | A | B | B | A | A | B | C | A | C | D | D | D |

As shown in Tables 6 to 8, the ink compositions of Examples formed recorded matter with less uneven density defects, whereas the ink composition of Comparative Example 4 formed recorded matter with many uneven density defects. The ink composition of Comparative Example 4 contains a solvent having a high boiling point, glycerin, to considerably decrease the ink drying property and probably thereby caused uneven density defects in the recorded matter.

3.2.4. Evaluation of Abrasion Resistance of Recorded Matter

Images were recorded on each recording medium as in the above-described "3.2.3. Evaluation of uneven density defects of recorded matter". The recorded matter was left to stand in a laboratory under conditions of room temperature (25° C.) for 5 hours, and the surface of the recorded matter was rubbed with a cotton cloth 20 times under a load of 200 g with a Gakushin-type rubbing fastness tester (trade name: AB-301, manufactured by Tester Sangyo Co., Ltd.). Abrasion resistance was evaluated by observing conditions of detachment of the recorded surface and of ink transfer to the cotton cloth. The evaluation results are shown in Tables 6 to 8. Table 6 shows the evaluation results in the case of using high-quality paper (5PW8R) as the recorded medium, Table 7 shows the evaluation results in the case of using printing paper (POD Gloss Coat) as the recorded medium, and Table 8 shows the evaluation results in the case of using a polypropylene film (SY51M) as the recording medium. The evaluation criteria are as follows:

A: no ink detachment and ink transfer to cotton cloth are observed after rubbing 20 times,
B: slight ink detachment or ink transfer to cotton cloth is observed after rubbing 20 times,
C: ink detachment or ink transfer to cotton cloth is observed after rubbing 20 times, and
D: ink detachment or ink transfer to cotton cloth is observed before the completion of rubbing 20 times.

As shown in Tables 6 to 8, the ink compositions of Examples formed recorded matter having excellent abrasion resistance, whereas the ink compositions of Comparative Examples 1 and 4 formed recorded matter with low abrasion resistance. In particular, the ink composition of Comparative Example 4 contains glycerin to considerably decrease the ink drying property and probably thereby decreases the abrasion resistance of the recorded matter.

In the ink composition of Comparative Example 1 of which the first polymer particles have an average particle diameter of less than 200 nm, the image on plain paper did not have sufficient abrasion resistance. In the ink compositions of Comparative Examples 2 and 3 of which the second polymer particles have an average particle diameter of 200 nm or more and an MFT of less than 100° C., the images on the non-ink-absorbing medium, i.e., on the polypropylene film, did not have sufficient abrasion resistance.

From the above-described Examples, it is obvious that the ink composition of the invention can form images having excellent abrasion resistance and high color development and less uneven density defects regardless of the recording medium and that the ink composition has excellent storage stability and can reduce clogging of nozzles. In particular, effects of increasing abrasion resistance and of decreasing uneven density defects can be obtained in the case of a low-ink-absorbing or non-ink-absorbing recording medium, which has difficulty in achieving high abrasion resistance and a reduction in uneven density defect, as in the case of plain paper.

The invention is not limited to the above-described embodiment, and various modifications are possible. For example, the invention includes configurations that are substantially the same as those described in the embodiment (for example, a configuration having the same function, method, and result, or a configuration having the same object and effect). The invention includes configurations in which portions not essential in the configurations described in the embodiment are replaced with other. The invention also includes configurations that achieve the same functions and effects or achieve the same objects of those of the configurations described in the embodiment. In addition, the invention includes configurations in which known techniques are added to the configurations described in the embodiment.

What is claimed is:

1. An ink composition comprising:
   a coloring material;
   an alkyl polyol having a boiling point at one atmosphere in a range of 180 to 230° C.;
   a glycol ether selected from the group consisting of ethylene glycol monoisohexyl ether, diethylene glycol monoisohexyl ether, triethylene glycol monoisohexyl ether, and ethylene glycol monoisoheptyl ether;

first polymer particles having an average particle diameter of 200 nm or more and a minimum film-forming temperature of less than 100° C.; and second polymer particles having an average particle diameter of less than 200 nm and a minimum film-forming temperature of 100° C. or more, wherein the ink composition does not substantially contain an alkyl polyol having a boiling point at one atmosphere of 280° C. or more, and the first polymer particles are selected from the group consisting of ethylene-polar monomer copolymer resin particles, and urethane resin particles.

2. The ink composition according to claim 1, wherein the second polymer particles are polyethylene wax particles.

3. The ink composition according to claim 1, wherein
the coloring material is a resin-dispersed pigment where a pigment is dispersed with a resin dispersant; and
the resin-dispersed pigment has an average particle diameter of 50 nm or more and 180 nm or less.

4. The ink composition according to claim 1, wherein the alkyl polyol is an alkyl diol having 4 to 7 carbon atoms and not having side chain.

5. The ink composition according to claim 1, wherein the glycol ether has a hydrophile-lipophile balance value calculated by a Davies' method of 4.2 to 8.0.

6. The ink composition according to claim 1, further comprising an alkyl diol having 4 to 8 carbon atoms and having side chain.

7. An ink jet recording method comprising:
forming an image by discharging droplets of the ink composition according to claim 1 on a recording medium; and
drying the ink composition on the recording medium by heating the recording medium during and/or after the formation of the image.

8. An ink jet recording method comprising:
forming an image by discharging droplets of the ink composition according to claim 2 on a recording medium; and
drying the ink composition on the recording medium by heating the recording medium during and/or after the formation of the image.

9. An ink jet recording method comprising:
forming an image by discharging droplets of the ink composition according to claim 3 on a recording medium; and
drying the ink composition on the recording medium by heating the recording medium during and/or after the formation of the image.

10. An ink jet recording method comprising:
forming an image by discharging droplets of the ink composition according to claim 4 on a recording medium; and
drying the ink composition on the recording medium by heating the recording medium during and/or after the formation of the image.

11. An ink jet recording method comprising:
forming an image by discharging droplets of the ink composition according to claim 5 on a recording medium; and
drying the ink composition on the recording medium by heating the recording medium during and/or after the formation of the image.

12. An ink jet recording method comprising:
forming an image by discharging droplets of the ink composition according to claim 6 on a recording medium; and
drying the ink composition on the recording medium by heating the recording medium during and/or after the formation of the image.

13. The ink jet recording method according to claim 7, wherein the recording medium is an ink-absorbing, low-ink-absorbing, or non-ink-absorbing recording medium.

14. The ink jet recording method according to claim 8, wherein the recording medium is an ink-absorbing, low-ink-absorbing, or non-ink-absorbing recording medium.

15. The ink jet recording method according to claim 9, wherein the recording medium is an ink-absorbing, low-ink-absorbing, or non-ink-absorbing recording medium.

* * * * *